(12) United States Patent
Mermoud et al.

(10) Patent No.: US 10,346,277 B2
(45) Date of Patent: Jul. 9, 2019

(54) ADAPTIVE SAMPLING TO BUILD ACCURATE APPLICATION THROUGHPUT MODELS

(71) Applicant: Cisco Technology, Inc., San Jose, CA (US)

(72) Inventors: Grégory Mermoud, Veyras (CH); Jean-Philippe Vasseur, Saint Martin D'uriage (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 15/782,088

(22) Filed: Oct. 12, 2017

(65) Prior Publication Data
US 2019/0114245 A1 Apr. 18, 2019

(51) Int. Cl.
G06F 11/34 (2006.01)
H04L 12/26 (2006.01)
G06F 11/36 (2006.01)
H04L 29/06 (2006.01)

(52) U.S. Cl.
CPC ...... *G06F 11/3409* (2013.01); *G06F 11/3466* (2013.01); *G06F 11/3636* (2013.01); *H04L 43/12* (2013.01); *H04L 43/045* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 6,975,963 B2 | 12/2005 | Hamilton et al. | |
| 8,843,901 B2 | 9/2014 | Krajec et al. | |
| 9,628,499 B1 * | 4/2017 | Yu | H04L 63/1416 |
| 9,658,936 B2 | 5/2017 | Krajec et al. | |
| 9,692,775 B2 * | 6/2017 | Zhang | H04L 43/024 |
| 10,110,616 B1 * | 10/2018 | Xie | H04L 63/1425 |

(Continued)

OTHER PUBLICATIONS

Chowdhury, et al., "PayLess: A low cost network monitoring framework for Software Defined Networks", 2014 IEEE Network Operations and Management Symposium (NOMS), pp. 1-9, 2014, IEEE.

(Continued)

*Primary Examiner* — Mohammad S Adhami
(74) *Attorney, Agent, or Firm* — Behmke Innovation Group LLC; James Behmke; Stephen D. LeBarron

(57) ABSTRACT

In one embodiment, a node in a network reports, to a supervisory service, histograms of application-specific throughput metrics measured from the network. The node receives, from the supervisory service, a merged histogram of application-specific throughput metrics. The supervisory service generated the merged histogram based on a plurality of histograms reported to the supervisory service by a plurality of nodes. The node performs, using the merged histogram, application throughput anomaly detection on traffic in the network. The node causes performance of a mitigation action in the network when an application throughput anomaly is detected. The node adjusts, based on a control command sent by the supervisory service, a histogram reporting strategy used by the node to report the histograms of application-specific throughput metrics to the supervisory service.

20 Claims, 14 Drawing Sheets

(56) References Cited

U.S. PATENT DOCUMENTS

2016/0218951 A1* 7/2016 Vasseur ............... H04L 43/12
2018/0027006 A1* 1/2018 Zimmermann ..... H04L 63/0245
　　　　　　　　　　　　　　　　　　　　　　　　　　726/11

OTHER PUBLICATIONS

Faerman, et al., "Adaptive Performance Prediction for Distributed Data-Intensive Applications", SC '99: Proceedings of the 1999 ACM/IEEE Conference on Supercomputing, pp. 1-15, 1999, IEEE.
Hernandez, et al., "Adaptive Sampling for Network Management", HCS Research Lab.; Dec. 2000, pp. 1-23.

* cited by examiner

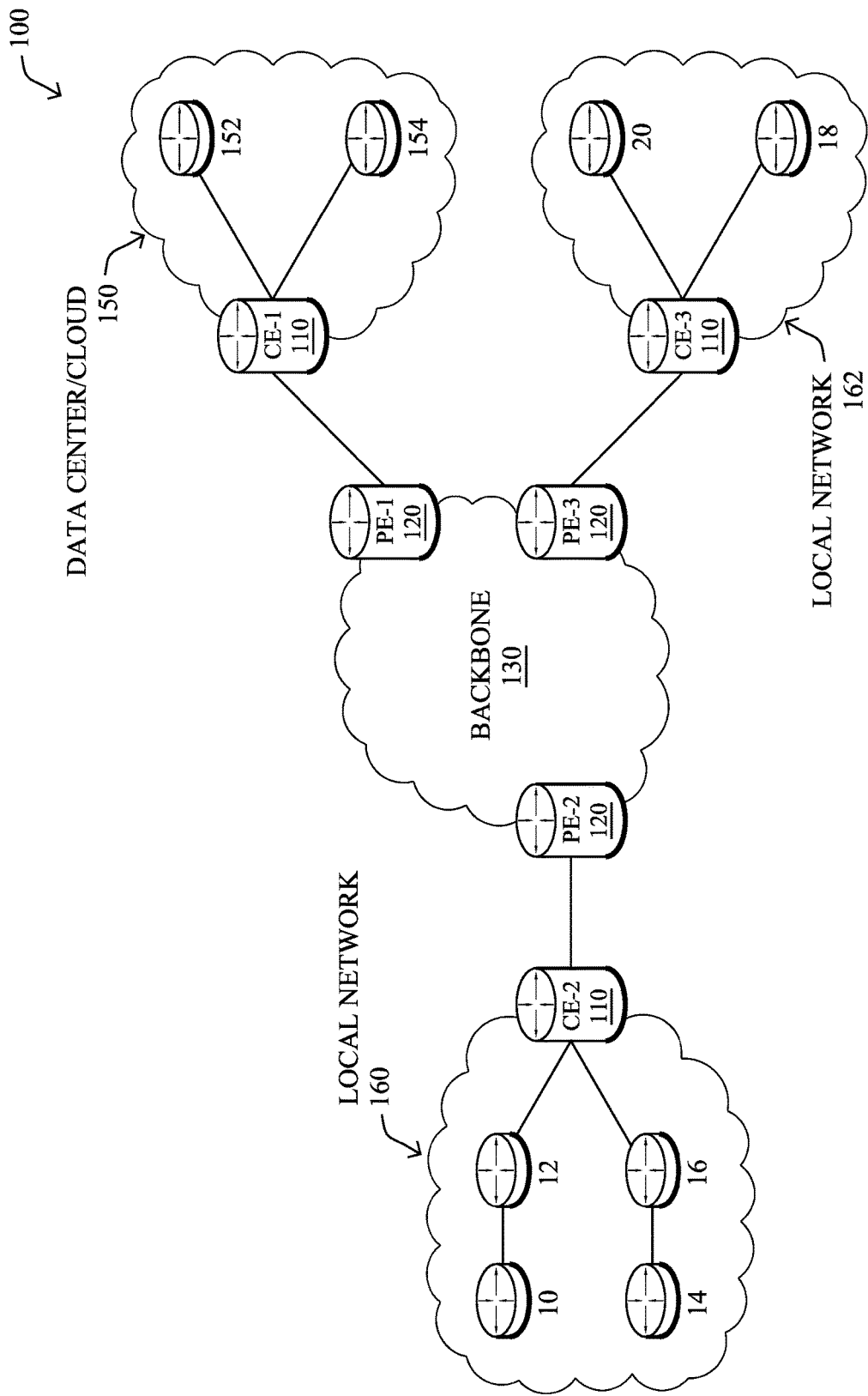

ADAPTIVE SAMPLING TO BUILD ACCURATE APPLICATION THROUGHPUT MODELS

TECHNICAL FIELD

The present disclosure relates generally to computer networks, and, more particularly, to adaptive sampling to build accurate application throughput models.

BACKGROUND

Many network assurance systems rely on predefined rules to determine the health of the network. In turn, these rules can be used to trigger corrective measures and/or notify a network administrator as to the health of the network. For instance, in an assurance system for a wireless network, one rule may comprise a defined threshold for what is considered as an acceptable number of clients per access point (AP) or the channel interference, itself. More complex rules may also be created to capture conditions over time, such as a number of events in a given time window or rates of variation of metrics (e.g., the client count, channel utilization, etc.). With more advanced analytics, it may even be possible to implement such an assurance system as a remote or cloud-based service.

One such metric that may be monitored and assessed by a network assurance system is application throughput. In general, application throughput is focused not simply on the overall data throughput in the monitored network, but on the throughputs of different applications present in the network. Notably, different applications may have different requirements in terms of throughput and lack of sufficient throughput is the cause of many application malfunctions (e.g., low quality in an audio or video stream, unresponsive remote desktops, etc.).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 1A-1B illustrate an example communication network;

DESCRIPTION OF EXAMPLE EMBODIMENTS

Overview

Figure 1A:
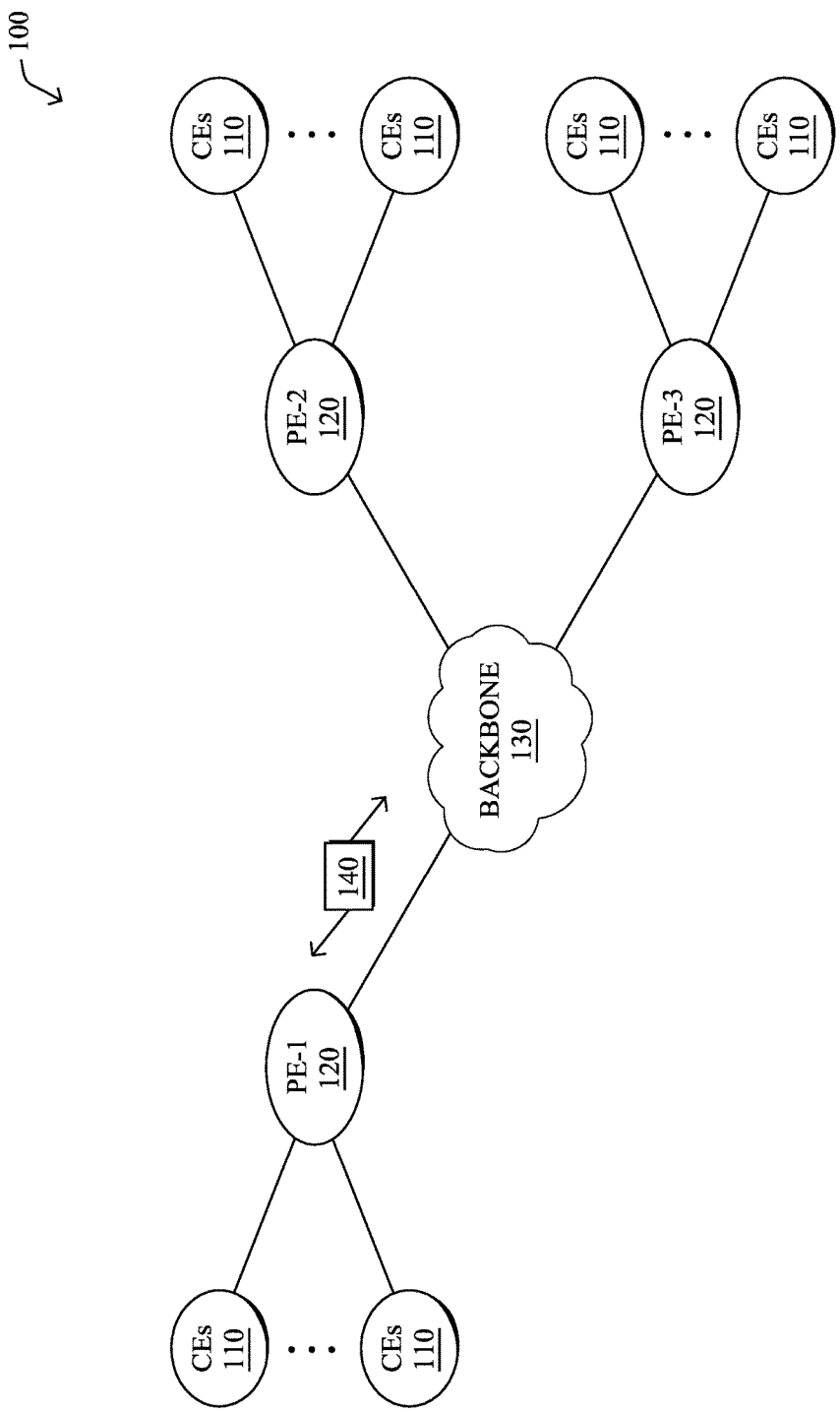

According to one or more embodiments of the disclosure, a node in a network reports, to a supervisory service, histograms of application-specific throughput metrics measured from the network. The node receives, from the supervisory service, a merged histogram of application-specific throughput metrics. The supervisory service generated the merged histogram based on a plurality of histograms reported to the supervisory service by a plurality of nodes. The node performs, using the merged histogram, application throughput anomaly detection on traffic in the network. The node causes performance of a mitigation action in the network when an application throughput anomaly is detected. The node adjusts, based on a control command sent by the supervisory service, a histogram reporting strategy used by the node to report the histograms of application-specific throughput metrics to the supervisory service.

In further embodiments, a supervisory service receives histograms of application-specific throughput metrics from a plurality of nodes in one or more networks. The supervisory service merges the received histograms into a merged histogram of application-specific throughput metrics. The supervisory service deploys the merged histogram to the plurality of nodes for use by the nodes for application throughput anomaly detection. The supervisory service adjusts the histogram reporting strategy of one or more of the plurality.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement (SLA) characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
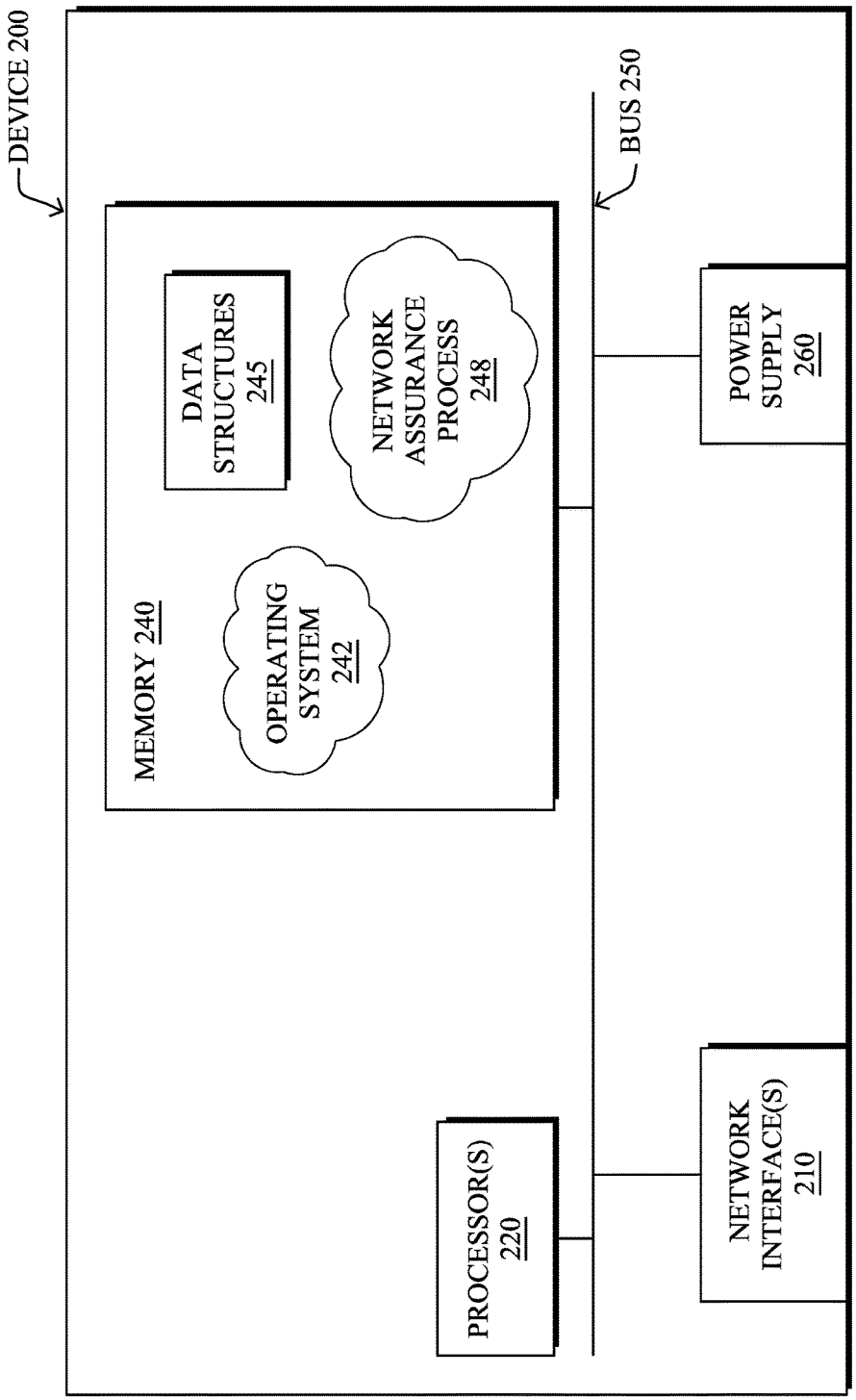
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
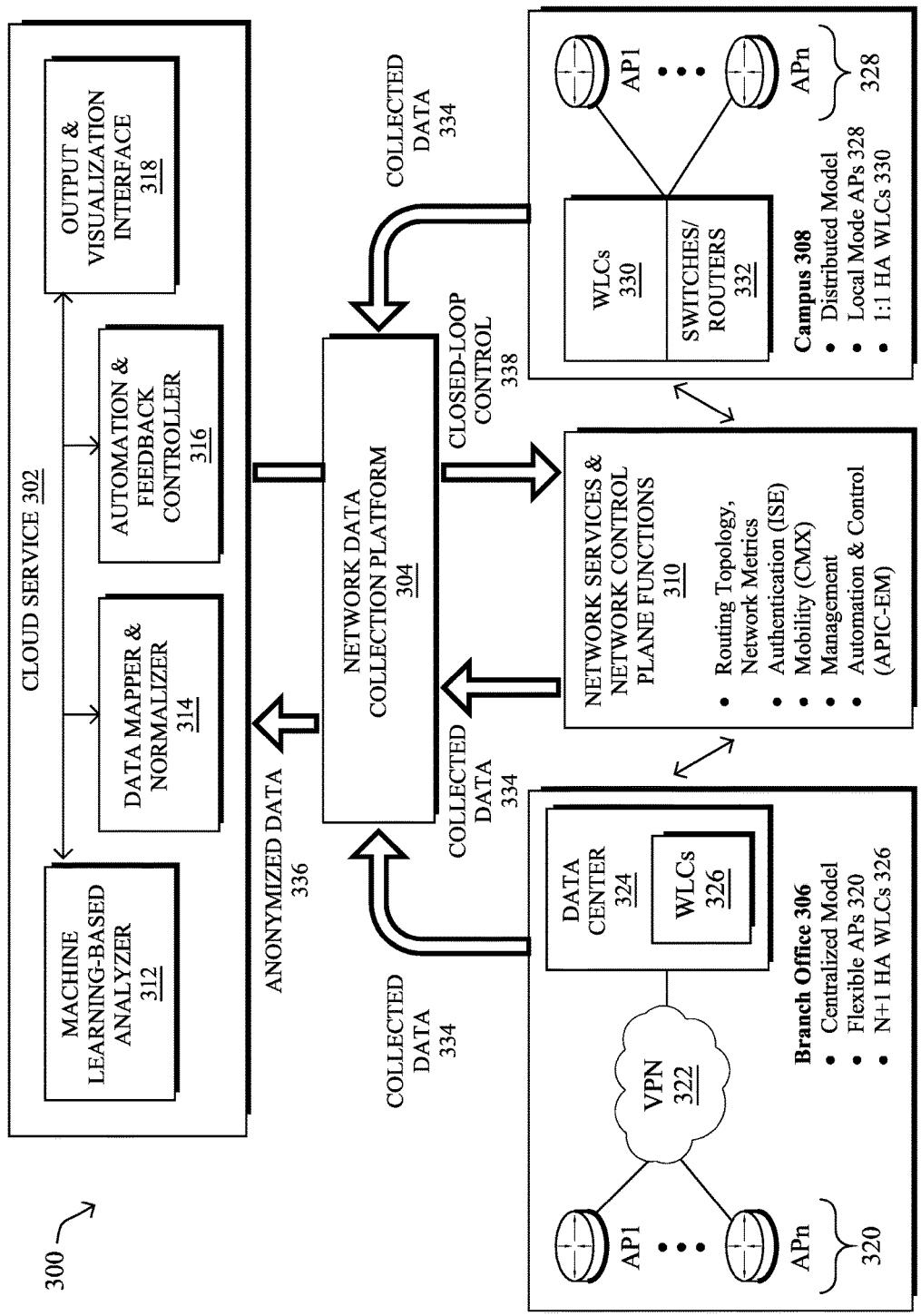
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an organization (e.g., a company, school, etc.) that includes any number of local networks. For example, cloud service 302 may oversee the operations of the local networks of any number of branch offices (e.g., branch office 306) and/or campuses (e.g., campus 308) that may be associated with the organization. Data collection from the various local networks/locations may be performed by a network data collection platform 304 that communicates with both cloud service 302 and the monitored network of the organization.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, detecting and forecasting application throughput issues is a critical problem in network assurance, in both wired and wireless networks. Lack of sufficient throughput is the root cause for many application malfunctions (e.g., low quality in audio and video stream, irresponsive remote desktops, etc.). Furthermore, the approach allows for assessing the overall performance of the network through the application performance in contrast with usual techniques whereby a set of networking variables are used to monitor the network quality of service.

However, applicative patterns are typically very irregular, occurring in short bursts of a few milliseconds separated by long periods of inactivity or low-throughput background activity. Many telemetry methods (e.g., Netflow, SNMP, proprietary protocols, etc.) provide traffic information for different applications identified via technologies such as Network Based Application Recognition (NBAR), but they actually report the total traffic observed in a given time-interval, often in the range of several tens of seconds or even several minutes. As a result, it is challenging to use these data for identifying situations where the network is not offering enough bandwidth to a given application, since one cannot really distinguish between a healthy scenario (e.g., a 3 Mbps high-resolution video stream of 10 seconds) and a degraded scenario (e.g., a 1.5 Mbps stream of 20 seconds), based on total traffic sampled at five minutes, since both situations will yield a total traffic of 3.75 MB.

One approach to the above challenges would be to observe/sample traffic at a much finer time granularity. However, if done naïvely, this approach can lead to vast amounts of telemetry data being generated. In turn, this could negatively impact the performance of the network (e.g., by bogging down the network through reporting), or be prohibitively expensive to process. This is especially true for cloud-based analytic system, such as network assurance system 300 detailed above, where traffic metrics are gathered from many networking elements/nodes and sent to the cloud for analysis.

Adaptive Sampling to Build Accurate Application Throughput Models

The techniques herein introduce an adaptive sampling mechanism that allows for the building of accurate application throughput models, which can then be used to detect throughput anomalies in the network. More specifically, the techniques herein introduce a set of mechanisms that allow for fine-grained sampling of application throughput metrics, while using a supervisory service to coordinate the collection and reporting of the metrics by the distributed nodes in the network. In some aspects, the supervisory service may reduce or even suppress the reporting of samples when accurate throughput anomaly detection models have been built. Such an approach allows for scaling while augmenting the accuracy of throughput anomaly detection and while minimizing sampling overhead. In further aspects, the throughput metrics and throughput anomaly detection may be performed on an individual application basis or, in some cases, be for specific pairs of applications and device types.

Specifically, according to one or more embodiments of the disclosure as described in detail below, a node in a network reports, to a supervisory service, histograms of application-specific throughput metrics measured from the network. The node receives, from the supervisory service, a merged histogram of application-specific throughput metrics. The supervisory service generated the merged histogram based on a plurality of histograms reported to the supervisory service by a plurality of nodes. The node performs, using the merged histogram, application throughput anomaly detection on traffic in the network. The node causes performance of a mitigation action in the network when an application throughput anomaly is detected. The node adjusts, based on a control command sent by the supervisory service, a histogram reporting strategy used by the node to report the histograms of application-specific throughput metrics to the supervisory service.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, FIGS. 4A-4D illustrates an example architecture 400 for monitoring application throughput in one or more networks, according to various embodiments. In some implementations, the components of architecture 400 may be implemented within a network assurance system, such as system 300 shown in FIG. 3. Accordingly, the components of architecture 400 shown may be implemented as part of cloud service 302, as part of network data collection platform 304, and/or on network element/data source 402 itself. Further, these components may be implemented in a distributed manner or implemented as its own stand-alone service, either as part of the local network under observation or as a remote service. In addition, the functionalities of the components of architecture 400 may be combined, omitted, or implemented as part of other processes, as desired.

As shown and continuing the example of FIG. 3, a network assurance system may rely on data collection and reporting by any number of network entities/nodes 402 (e.g., APs, WLCs, routers, switches, servers, etc.) deployed across any number of networks associated with any number of different organizations. Notably, cloud service 302 may be configured to communicate and supervise any number of network entities/nodes 402 (e.g., a first through $n^{th}$ entity/node) across any number of different entities or networks.

In various embodiments, one component of architecture 400 may be an application throughput sampler (ATS) 404, which is located on a network entity/node 402. In general, ATS 404 is configured to sample application throughput metrics from the network in which the hosting network entity/node 402 is located. For example, ATS 404 may rely on deep packet inspection (DPI) or heuristics related to traffic pattern recognition to achieve any or all of the following:

(1) Recognize the type of application that generated the traffic (note that ATS 404 can also rely on a technology such as NBAR for application recognition, in some cases).

(2) Identify the type of device/host using the application (e.g., iOS phone or tablet, Windows workstation, etc.). To that end, ATS 404 may use explicit signaling with the device, such as 802.11k/v for Wi-Fi, or use data gathered from the device authenticating with the network.

(3) Measure the instantaneous throughput down to a very small timescale. For example, in some cases, this rate may be one millisecond or even less. In turn, ATS 404 may build a histogram (APP, DEVICE, TIMESCALE) for each application (APP) and device type (DEVICE) at given timescale (TIMESCALE). In another embodiment, ATS 404 may use merging strategies to build one histogram for multiple device types or applications when the individual histograms are very similar. In yet another embodiment, ATS 404 may use a clustering mechanism to detect similarities between device types and application types, in order to determine "similar" groups. This can be achieved using a hierarchical structure, where data for a given (APP, DEVICE) pair is also used to update a hierarchy of histograms corresponding to coarser granularity.

In some cases, ATS 404 may also be configured to "forget" application throughput metrics over time, so that older metrics are not used in a given histogram. For example, ATS 404 may only use the top k-number of samples or samples captured within a moving time window t, to generate a given histogram.

Figure 4A:
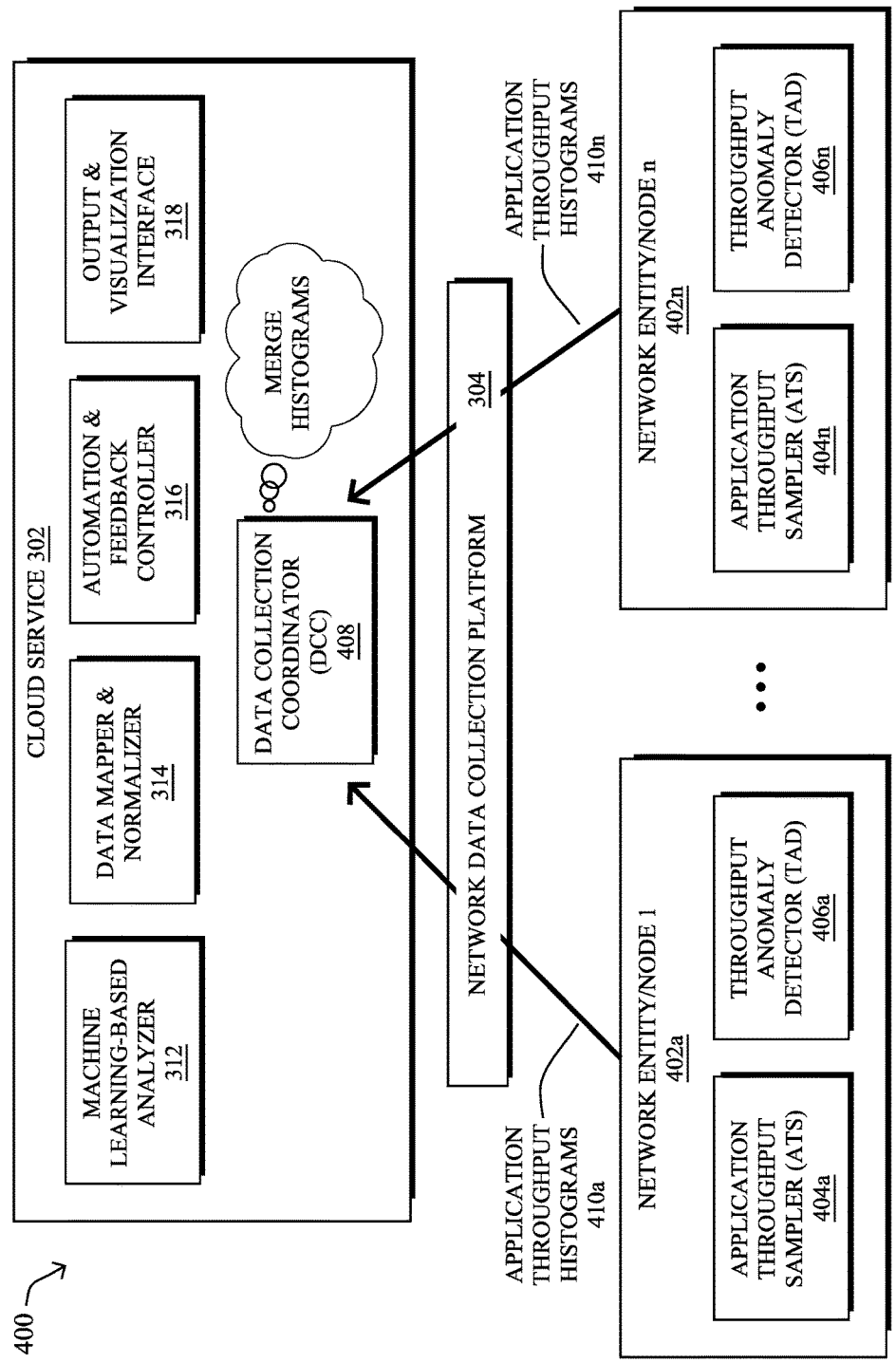
FIGS. 4A-4D illustrates an example architecture for monitoring application throughput in one or more networks.

After constructing the histograms of the application-specific throughput metrics, ATS 404 may push/send the resulting histograms to cloud service 302 for analysis (e.g., via network data collection platform 304). For example, as shown in FIG. 4A, ATS 404*a* of the first entity/node 402*a* may send its application throughput histograms 410*a* to a data collection coordinator (DCC) 408 of cloud service 302, ATS 404*n* of the nth entity/node 402*n* may send its application throughput histograms 410*n* to DCC 408, etc.

Note also that an ATS 404 can also build different histograms 410 for the same application, but at different time scales. For example, application throughput histograms 410*a* may include histograms constructed using application-specific throughput metrics sampled from the local network at different intervals such as every 10 milliseconds, 1 second, and 10 seconds. Notably, the resulting distributions can capture different types of information for assessment by cloud service 302.

In various embodiments, DCC 408 may be a cloud-based component (e.g., of cloud service 302) that is responsible for coordinating the data collection across the various network entities/nodes 402. As noted, DCC 408 may receive application throughput histograms 410 from any or all of the ATS 404 located on the network entities/nodes 402. In turn, as shown in FIG. 4A, DCC 408 may merge their respective histograms 410 into a single, more statistically relevant histogram.

Figure 5A:
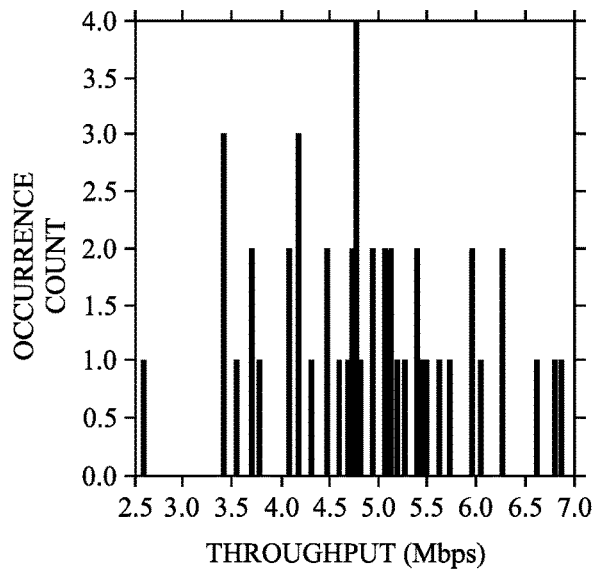
FIGS. 5A-5D illustrate examples of histograms of application-specific throughput metrics being merged.
Figure 5B:
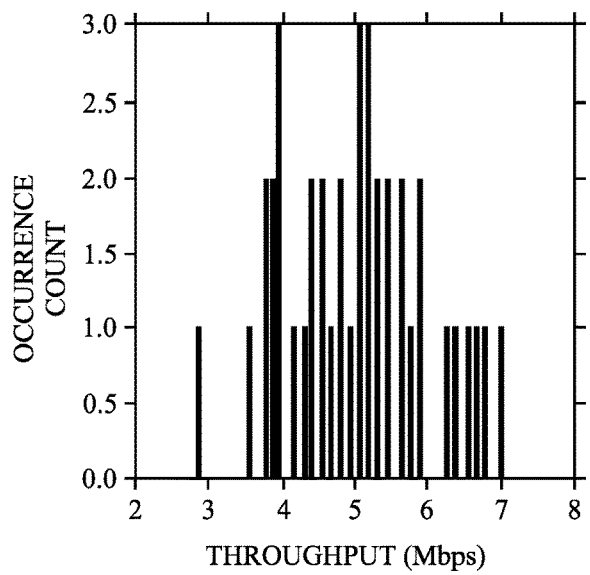
Figure 5C:
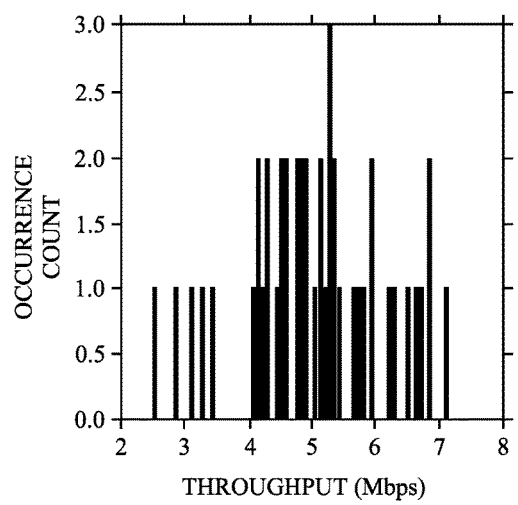
Figure 5D:
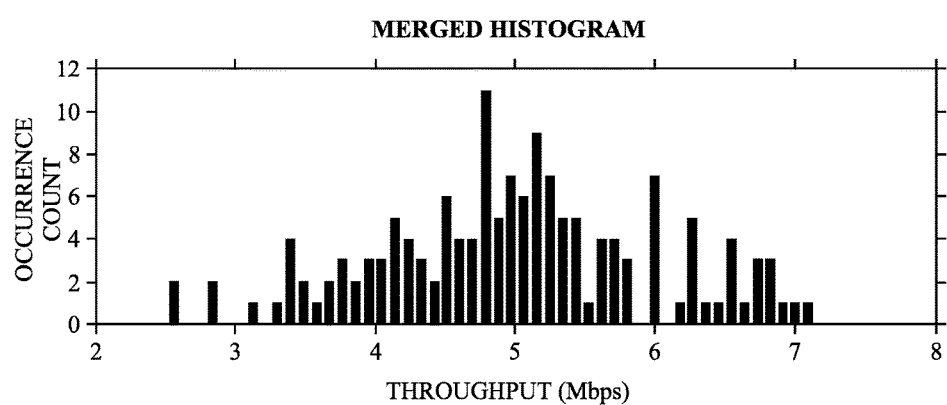

FIGS. 5A-5D illustrate examples of histograms of application-specific throughput metrics being merged. As shown in FIGS. 5A-5C, assume that application throughput histograms 500, 510, and 520, respectively, are each generated by different network entities/nodes, such as entities/nodes 402, and for the same application. Note that the application itself may be identified through examination of the protocols, ports, headers, etc., that its traffic uses. For example, the application may be a specific conferencing application, messaging application, web browsing application, file transfer application, or any other application executing in the monitored network.

From histograms 500-520, it can be seen that the observed network throughputs for the traffic associated with the application varies somewhat across the different vantage points. However, all three of histograms 500-520 are relatively similar in that their means are centered around 5 Mbps and range from approximately 2.5 Mbps to 7.5 Mbps. Consequently, DCC 408 may merge histograms 500-520 into the merged histogram 530 shown in FIG. 5D.

Referring again to FIG. 4A, DCC 408 can perform histogram merging in a number of ways. These ways include, for example, averaging/summing all histograms counts, or applying a similar weight method to the histograms 410 whereby histograms 410 are normalized to density estimates before merging. Note that DCC 408 may also select which of histograms 410 to merge based on their characteristics (e.g., their associated application, device type, and/or timeframe).

Figure 4B:
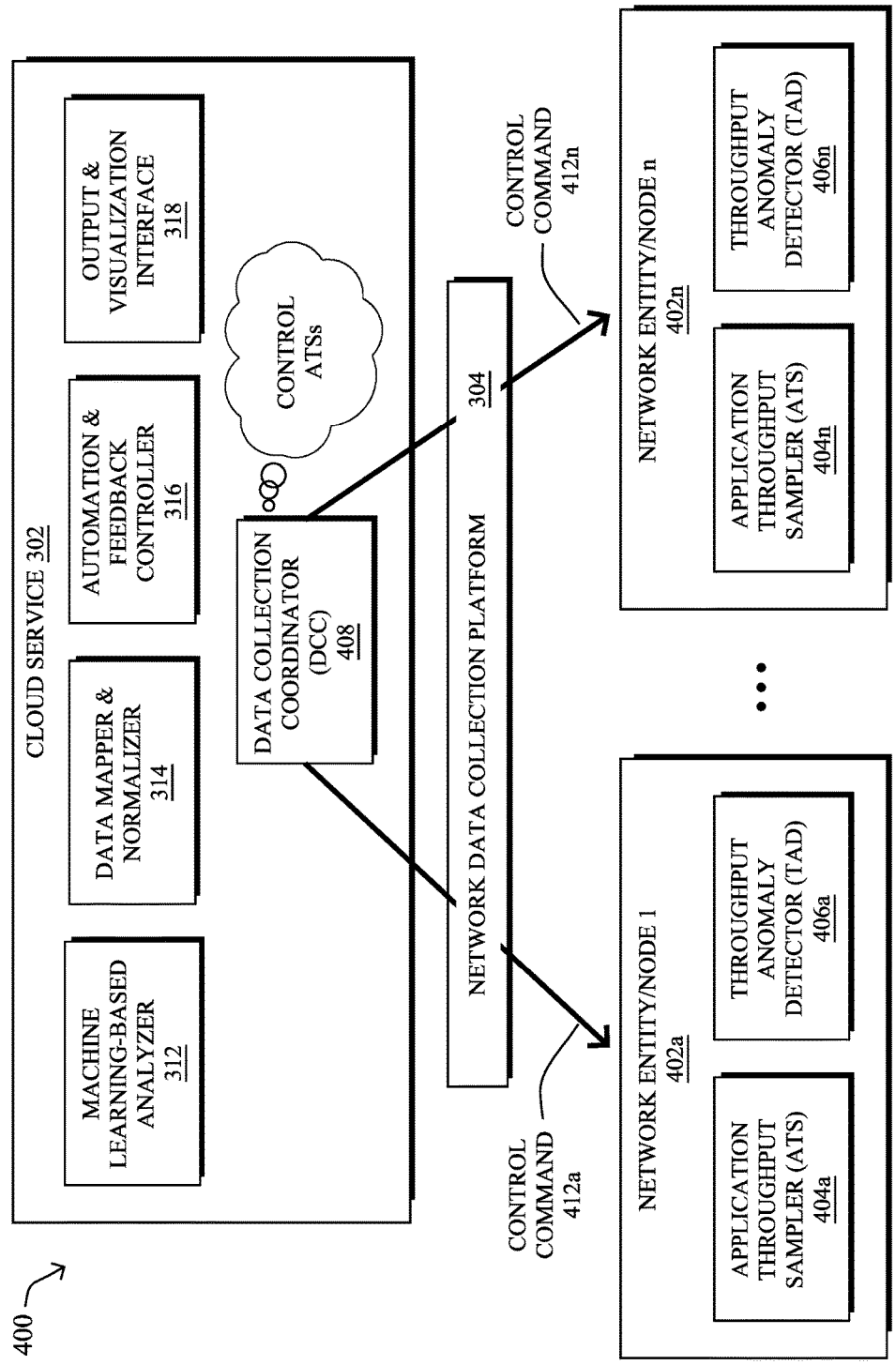

In various embodiments, DCC 408 may also provide supervisory control over the histogram generation and/or reporting by the distributed ATS 404, as shown in FIG. 4B. Notably, depending on the reported histograms 410 and their analysis by DCC 408, DCC 408 may send control commands 412 to the ATS 404. Generally, a given control command 412 may cause the receiving ATS 404 to adjust its histogram reporting strategy that the ATS 404 uses to determine when to report histograms 410 to DCC 408 (e.g., a histogram reporting rate) and/or what is reported to DCC 408 (e.g., by adjusting how the ATS 404 generates a given histogram 410).

By way of example, assume that the sample count of the reported histograms 410 to DCC 408 is above a suitable threshold. In such a case, a given control command 412 sent by DCC 408 to a selected ATS 404 may comprise a SET_PUSH_RATE(APP, DEVICE, RATE, TIME SCALE) message with a smaller value for RATE, so that the ATS 404 will push the histogram 410 to DCC 408 less often. DCC 408 can also set the rate to zero, to prevent any further pushed histograms from an ATS 404.

In some cases, DCC 408 may also decide not to merge some histograms because they are too different. This is generally because the throughput is not nominal (e.g., already degraded) at the time of the data collection by network entities/nodes 402. In this case, a given control command 412 from DCC 408 to an ATS 404 may be a CLEAR_HISTOGRAM(APP, DEVICE) message that triggers the receiving ATS 404 to start the data collection and histogram building from scratch.

Figure 6A:
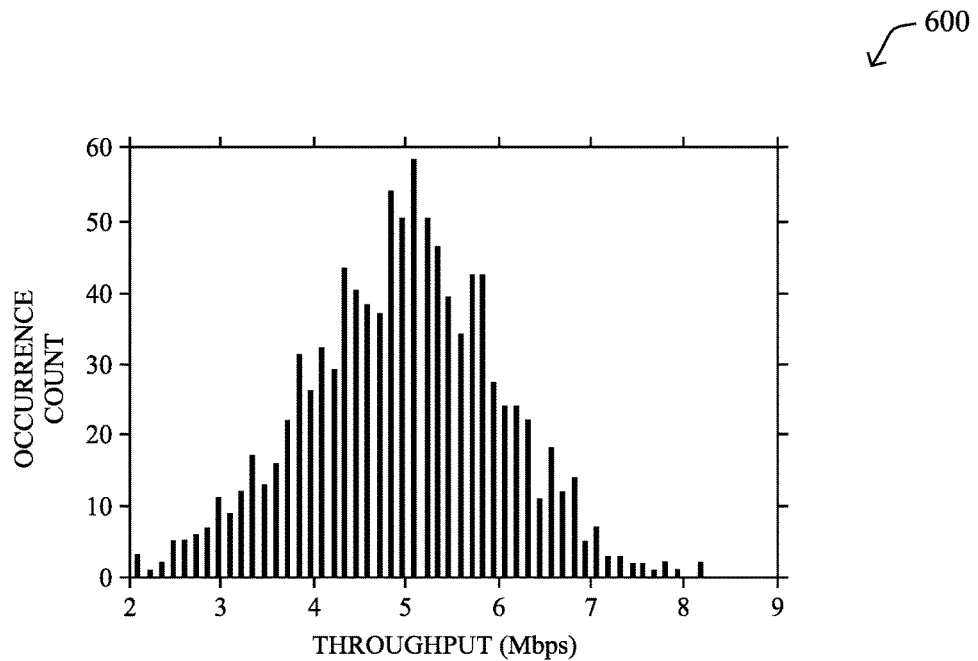
FIGS. 6A-6C illustrate examples of histograms being excluded from a merge.
Figure 6B:
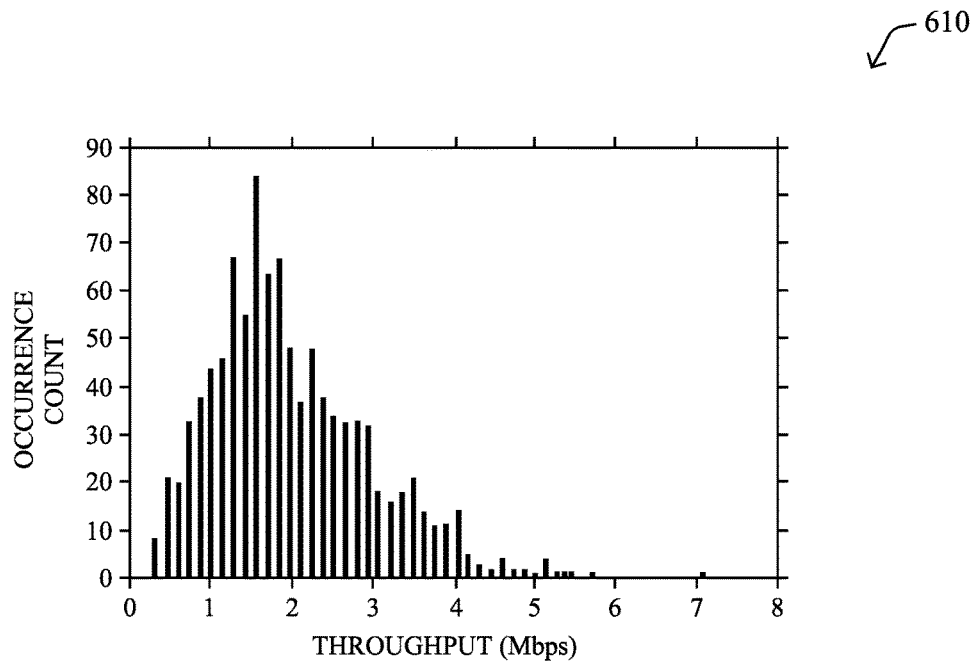
Figure 6C:
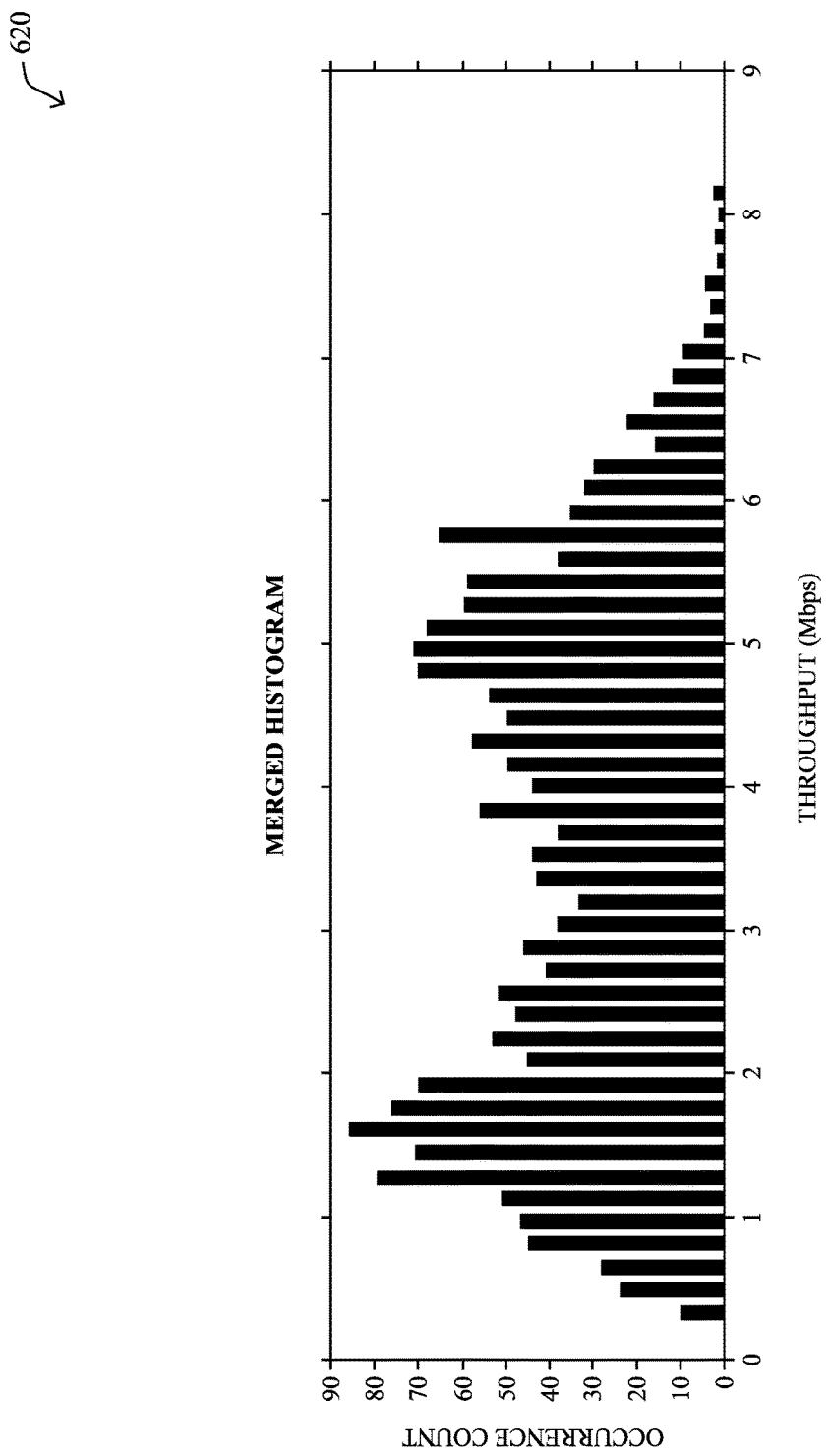

FIGS. 6A-6C illustrate examples of histograms being excluded from a merge. As shown, histogram 600 in FIG. 6A and histogram 610 in FIG. 6B have very different application throughput distributions. Merging histograms 600-610 would thus result in the merged histogram 620, which is highly non-Gaussian and is unlikely to be suitable for purposes of throughput anomaly detection.

Referring again to FIG. 4B, another control command 412 that DCC 408 may send is a SET_FORGETTING_RATE (APP, DEVICE, RATE, TIMESCALE) message. Generally, such a message can be used by DCC 408 to adjust the forgetting rates of the histograms at an ATS 404. Said differently, such a control command 412 may adjust a rate at which the network entity/node 402 prevents older application-specific throughput metrics from inclusion in a histogram 410 generated by the node. For instance, this can be used to decrease forgetting for histograms 410 that have been observed by DCC 408 to be rather stable but low-sample (e.g., a rarely used application). Both rates can be set by DCC 408, taking into account additional business information, such as the bandwidths or criticality of links between the components of cloud service 302 and the distributed ATS 404.

Figure 4C:
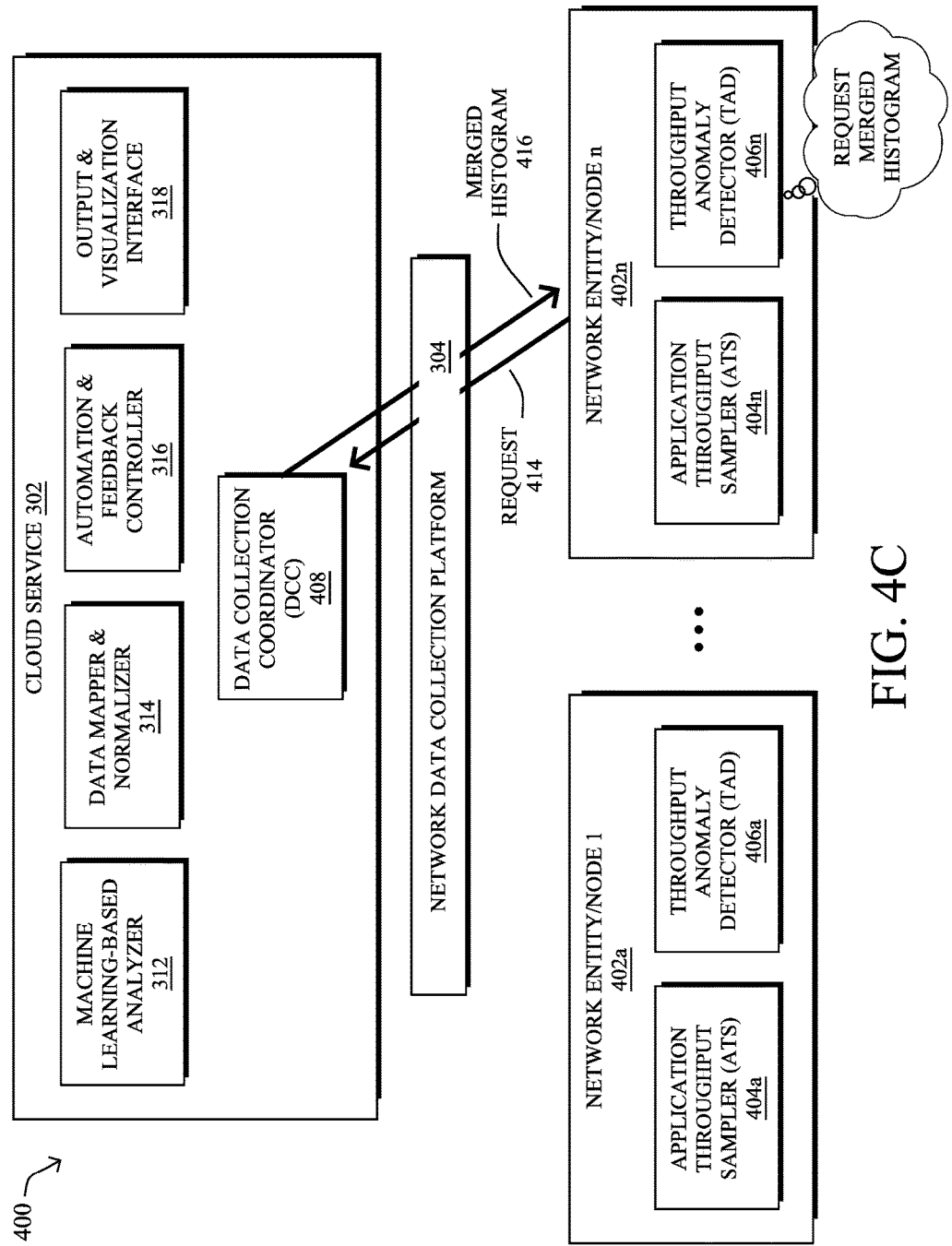

In various embodiments, another component of architecture 400 may be a throughput anomaly detector (TAD) 406, that is also co-located with ATS 404 on a network element/node 402 and consumes the same DPI or other traffic data as ATS 404. During operation, a TAD 406 may use the merged histograms constructed by DCC 408 to detect throughput anomalies. For example, as shown in FIG. 4C, TAD 406*n* hosted by network entity/node 402*n* may send a GET_HISTOGRAM(APP, DEVICE, TIME SCALE) request 414 to DCC 408 for a specific application, device type, and time scale, that TAD 406*n* is to use for purposes of detecting throughput anomalies in the local network of entity/node 402*n*. In response, DCC 408 may provide the merged histogram 416 requested by request 414 to TAD 406*n* for use. In other embodiments, DCC 408 may push one or more merged histograms 416 to TAD 406*n*, without first receiving request 414.

To detect application-specific throughput anomalies in the local network, a TAD 406 may compare captured application-specific throughput metrics from the traffic in the local network to the corresponding merged histogram 416. Notably, in one embodiment, TAD 406 may use merged histogram 416 as a basis for a traffic model in an unsupervised learning-based traffic anomaly detector of TAD 406. Such a detector may, for example, check whether a given application throughput observed in the local network for a given device falls in a "dense" region of the merged histogram 416.

When TAD 406 determines that an observed application throughput in its local network is anomalous, TAD 406 may cause the performance of any number of mitigation actions. For example, one such action may be to send an anomaly alert to cloud service 302 or to another anomaly management system. In another example, TAD 406 may initiate a configuration change in its local network, such as a routing change, QoS change, causing the associated host to use a different AP, or the like.

In most implementations, a TAD 406 may accumulate several alerts before causing the performance of the mitigation action, so as to build enough evidence before the mitigation action is taken. Doing so, such as in the case of sending anomaly detection alerts, may reduce the false positive rate and optimize the bandwidth usage. In one embodiment, a TAD 406 may also be configured to adjust its sampling rates based on the rate at which TAD 406 raises anomaly detection alerts. For example, too many false alarms may be due to a lack of sufficient data points, thus requiring an increase in the sampling rate of the application-specific throughput metrics.

Figure 4D:
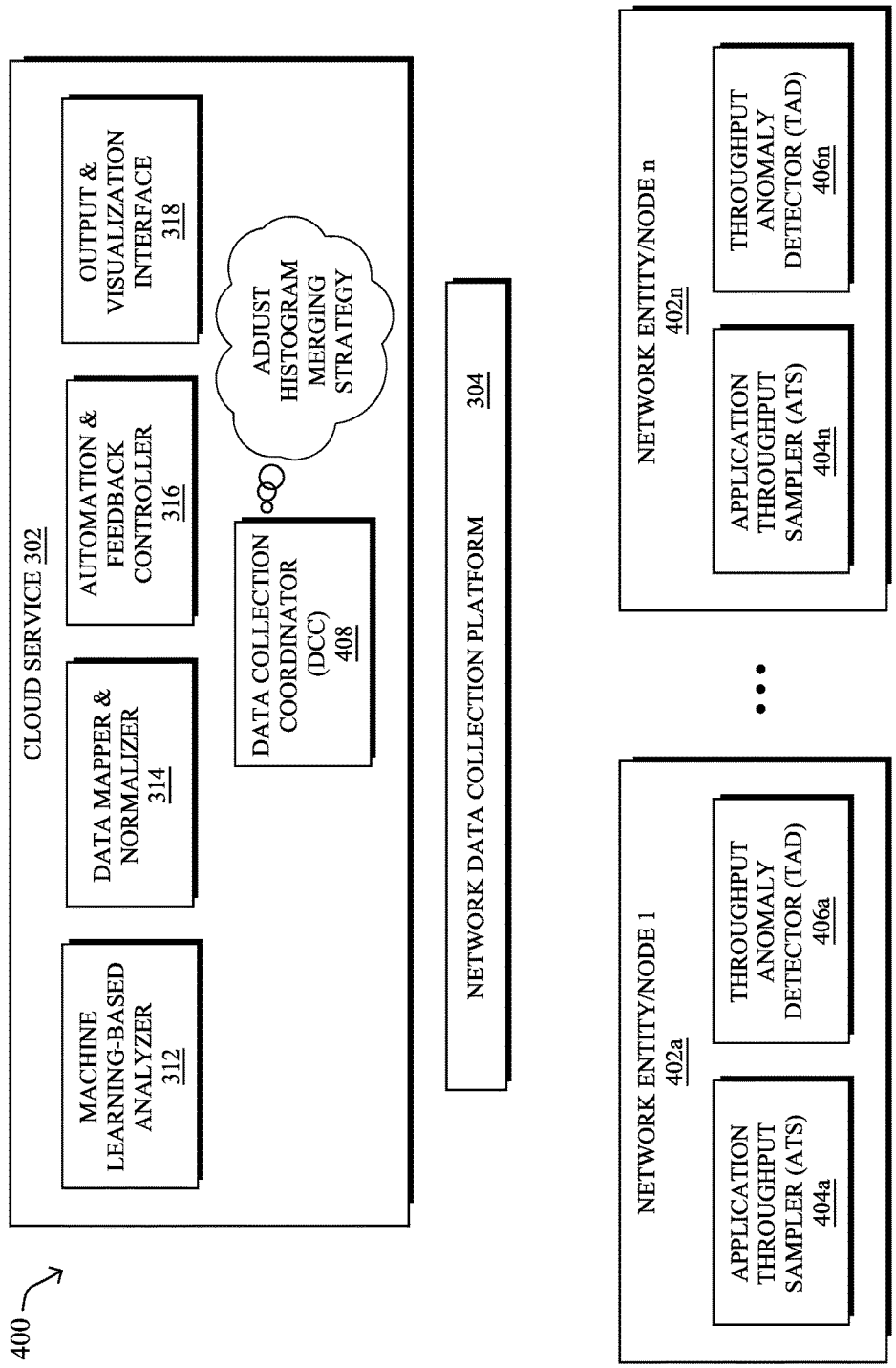

As shown in FIG. 4D, another aspect of the techniques herein is the dynamic adjustment of the histogram merging strategy employed by DC 408. Such an adjustment may be based on, for example, the rate at which a given TAD 406 detects or reports application-specific throughput anomalies to DCC 408. Indeed, the rate at which anomalies are detected by TAD 406 may be an indicator of inaccurate histograms (e.g., not enough points) or simply because the application profile seen by an ATS 404 is very specific to the observation environment. In such a case, DCC 408 may change its histogram merging strategy per APP with specific rates. For example, if the application usage (profile) for a given APP significantly differs between two groups of ATS 404, DCC 408 may build two types of histograms for that APP, each with their respective sampling and forgetting rates.

Figure 7:
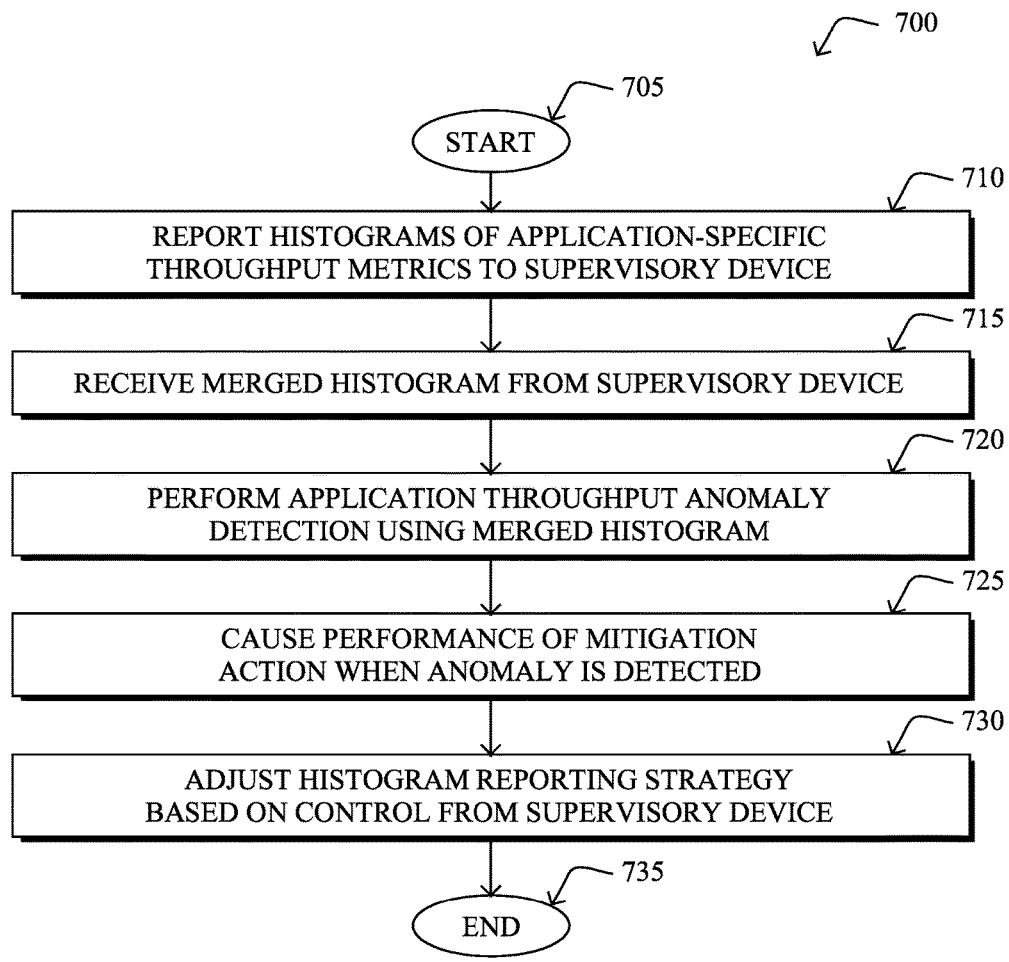
FIG. 7 illustrates an example simplified procedure for performing application throughput anomaly detection in a network.

FIG. 7 illustrates an example simplified procedure for performing application throughput anomaly detection in a network, in accordance with one or more embodiments described herein. For example, a non-generic, specifically configured device (e.g., device/node 200) may perform procedure 700 by executing stored instructions (e.g., process 248). The procedure 700 may start at step 705, and continues to step 710, where, as described in greater detail above, the node may report, to a supervisory service, histograms of application-specific throughput metrics measured from the network. In various embodiments, each reported histogram may be specific to the particular application, device/host type associated with the observed traffic used to form the histogram, and/or the sampling time period or rate used by the node.

At step 715, as detailed above, the node may receive, from the supervisory service, a merged histogram of application-specific throughput metrics. In various embodiments, the supervisory service generates the merged histogram based on a plurality of histograms reported to the supervisory service by a plurality of nodes. For example, the merged histogram may combine the application-specific throughput histograms from any number of nodes across any number of networks.

At step 720, the node may perform, using the merged histogram, application throughput anomaly detection on traffic in the network, as described in greater detail above. In one embodiment, the node may use an unsupervised machine learning model based on the merged histogram, to assess traffic flows in the network. For example, the node may sample an application throughput metric from observed traffic in the network and compare the metric to a throughput model based on the merged histogram, to determine whether the observed throughput metric is anomalous.

At step 725, as detailed above, the node may cause the performance of a mitigation action in the network when an application throughput anomaly is detected. For example, the node may send an alert to the supervisory service regarding the application throughput anomaly or initiate a configuration change in the network. In some cases, the node may hold off on causing the performance of the mitigation action until a certain condition is met, such as a threshold number of throughput anomalies being detected.

At step 730, the node may, based on a control command sent by the supervisory service, adjust its histogram reporting strategy, as described in greater detail above. In particular the node may use the strategy to control how and when the node reports the histograms of application-specific throughput metrics to the supervisory service. For example, one control command may adjust the rate at which the node sends the histograms to the service, while another command may cause the node to clear a current histogram of application-specific throughput metrics generated by the node. In another example, the command may adjust a rate at which the node prevents older application-specific throughput metrics from inclusion in a histogram generated by the node. Procedure 700 then ends at step 735.

Figure 8:
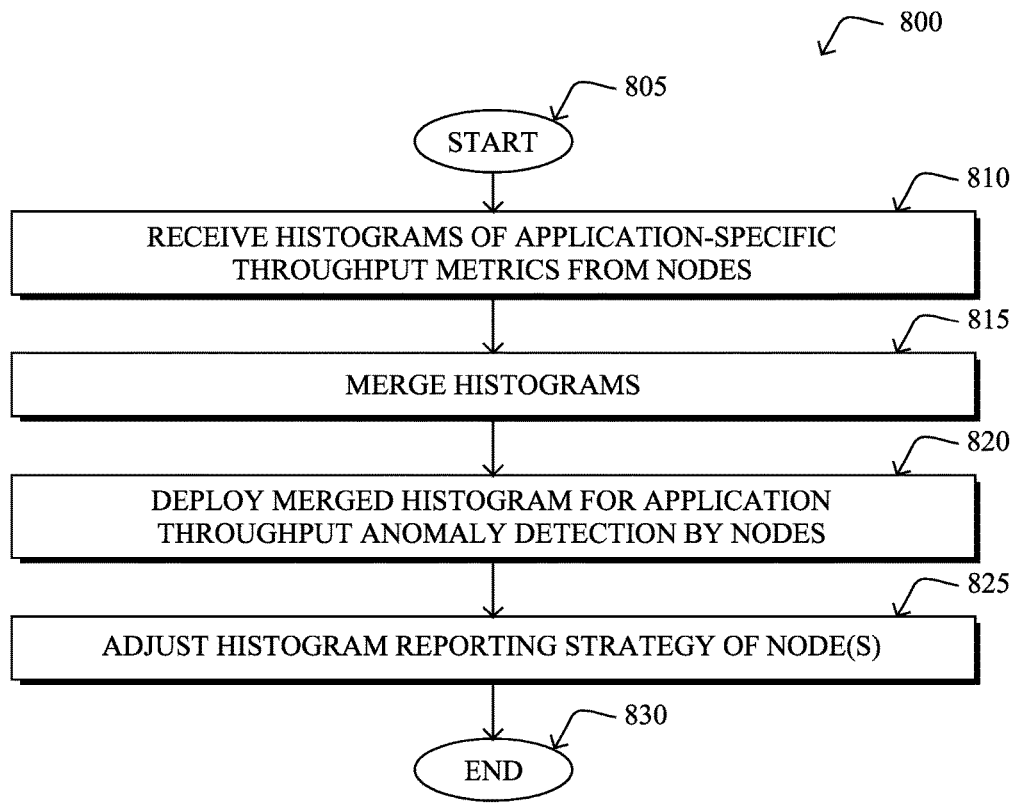
FIG. 8 illustrates an example simplified procedure for adjusting the reporting of application-specific throughput metrics by network nodes.

FIG. 8 illustrates an example simplified procedure for adjusting the reporting of application-specific throughput metrics by network nodes, in accordance with one or more embodiments described herein. For example, a non-generic, specifically configured device (e.g., a device/node 200) that implements a supervisory service (e.g., as part of a network assurance system) may perform procedure 800 by executing stored instructions (e.g., process 248). The procedure 800 may start at step 805, and continues to step 810, where, as described in greater detail above, the service may receive histograms of application-specific throughput metrics from a plurality of nodes in one or more networks.

At step 815, as detailed above, the supervisory service may merge the received histograms into a merged histogram. For example, if the received histograms are similar to one another (e.g., based on statistical distances or other metrics), the service may combine these histograms into a merged histogram for a particular application, device type, and/or time period.

At step 820, the supervisory service may deploy the merged histogram to the plurality of nodes for use by the nodes for application throughput anomaly detection, as described in greater detail above. For example, the receiving nodes may use the merged histogram to assess application-specific throughput metrics observed by the nodes in relation to the merged histogram. If an observed metric deviates statistically from the merged histogram, the node may determine that the throughput is anomalous.

At step 825, as detailed above, the supervisory service may adjust the histogram reporting strategy of one or more of the nodes. Such adjustments may control, for example, the rate at which the nodes report their histograms to the service, when the nodes are to forget samples for inclusion in their histograms, or even to reset the histograms being constructed by the nodes. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, allow for much more accurate application throughput modeling. In addition, the techniques herein limit bandwidth consumption by the reporting process and the resulting computational overhead of assessing observed application throughput metrics.

While there have been shown and described illustrative embodiments that provide for adaptive sampling to build accurate application throughput models, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   reporting, by a node in a network and to a supervisory service, histograms of application-specific throughput metrics measured from the network;
   receiving, at the node and from the supervisory service, a merged histogram of application-specific throughput metrics, wherein the supervisory service generated the merged histogram based on a plurality of histograms reported to the supervisory service by a plurality of nodes;
   performing, by the node and using the merged histogram, application throughput anomaly detection on traffic in the network;
   causing, by the node, performance of a mitigation action in the network when an application throughput anomaly is detected; and
   adjusting, by the node and based on a control command sent by the supervisory service, a histogram reporting strategy used by the node to report the histograms of application-specific throughput metrics to the supervisory service.

2. The method as in claim 1, wherein the control command comprises at least one of: a command to adjust a rate at which the node reports the histograms of application-specific throughput metrics to the supervisory service or a command to clear a current histogram of application-specific throughput metrics generated by the node.

3. The method as in claim 1, wherein the control command comprises a command to adjust a rate at which the node prevents older application-specific throughput metrics from inclusion in a histogram generated by the node.

4. The method as in claim 1, further comprising:
   adjusting, by the node and based on a rate at which anomalies are detected by the node, a sampling rate used by the node to sample the application-specific throughput metrics from traffic in the network.

5. The method as in claim 1, wherein reporting the histograms of application-specific throughput metrics measured from the network comprises:
   identifying, by the node, a particular application associated with a traffic flow in the network;
   identifying, by the node, a device type associated with the traffic flow; and
   constructing, by the node, a separate histogram for each application-device type pair observed by the node.

6. The method as in claim 1, further comprising:
   constructing, by the node, the histograms of application-specific throughput metrics by sampling the throughput metrics from traffic in the network at a sampling rate of one millisecond or less.

7. The method as in claim 1, wherein the mitigation action comprises at least one of: sending an anomaly detection alert or initiating a configuration change in the network.

8. The method as in claim 1, wherein performing application throughput anomaly detection on traffic in the network comprises:
   using, by the node, an unsupervised machine learning model based on the merged histogram, to assess traffic flows in the network.

9. A method comprising:
   receiving, at a supervisory service, histograms of application-specific throughput metrics from a plurality of nodes in one or more networks;
   merging, by the supervisory service, the received histograms into a merged histogram of application-specific throughput metrics;
   deploying, by the supervisory service, the merged histogram to the plurality of nodes for use by the nodes for application throughput anomaly detection; and
   adjusting, by the supervisory service, a histogram reporting strategy of one or more of the plurality of nodes.

10. The method as in claim 9, further comprising:
    receiving, at the supervisory service, anomaly detection alerts sent by one or more of the plurality of nodes; and
    adjusting, by the supervisory service, a merging strategy used by the supervisory service to merge the received histograms based on a rate at which the anomaly detection alerts are sent by the one or nodes.

11. The method as in claim 9, wherein the received histograms are for a particular application-device type pair.

12. The method as in claim 9, wherein adjusting the histogram reporting strategy of the one or of the plurality of nodes comprises:
    sending, by the supervisory service, a control command to the one or more nodes, wherein the control command comprises at least one of: a command to adjust a rate at which the node reports the histograms of application-specific throughput metrics to the supervisory service, a command to clear a current histogram of application-specific throughput metrics generated by the node, or a command to adjust a rate at which the node prevents older application-specific throughput metrics from inclusion in a histogram generated by the node.

13. An apparatus comprising:
one or more network interfaces to communicate with a network;
a processor coupled to the network interfaces and configured to execute one or more processes; and
a memory configured to store a process executable by the processor, the process when executed configured to:
report, to a supervisory service, histograms of application-specific throughput metrics measured from the network;
receive, from the supervisor, a merged histogram of application-specific throughput metrics, wherein the supervisory service generated the merged histogram based on a plurality of histograms reported to the supervisory service by a plurality of nodes;
perform, using the merged histogram, application throughput anomaly detection on traffic in the network;
cause performance of a mitigation action in the network when an application throughput anomaly is detected; and
adjust, based on a control command sent by the supervisory service, a histogram reporting strategy used by the node to report the histograms of application-specific throughput metrics to the supervisory service.

14. The apparatus as in claim 13, wherein the control command comprises at least one of: a command to adjust a rate at which the node reports the histograms of application-specific throughput metrics to the supervisory service or a command to clear a current histogram of application-specific throughput metrics generated by the node.

15. The apparatus as in claim 13, wherein the control command comprises a command to adjust a rate at which the node prevents older application-specific throughput metrics from inclusion in a histogram generated by the node.

16. The apparatus as in claim 13, wherein the process when executed is further configured to:
adjust, based on a rate at which anomalies are detected by the node, a sampling rate used by the node to sample the application-specific throughput metrics from traffic in the network.

17. The apparatus as in claim 13, wherein the apparatus reports the histograms of application-specific throughput metrics measured from the network by:
identifying a particular application associated with a traffic flow in the network;
identifying a device type associated with the traffic flow; and
constructing a separate histogram for each application-device type pair observed by the node.

18. The apparatus as in claim 13, wherein the process when executed is further configured to:
construct the histograms of application-specific throughput metrics by sampling the throughput metrics from traffic in the network at a sampling rate of one millisecond or less.

19. The apparatus as in claim 13, wherein the mitigation action comprises at least one of: sending an anomaly detection alert or initiating a configuration change in the network.

20. The apparatus as in claim 13, wherein the apparatus performs application throughput anomaly detection on traffic in the network by:
using an unsupervised machine learning model based on the merged histogram, to assess traffic flows in the network.

* * * * *